(12) United States Patent
Varadarajan

(10) Patent No.: US 8,201,007 B2
(45) Date of Patent: Jun. 12, 2012

(54) FINE GRAIN NON-INTRUSIVE DISTRIBUTED INFORMATION TECHNOLOGY INFRASTRUCTURE POWER MANAGEMENT SYSTEM

(75) Inventor: Srinivas Varadarajan, Mysore (IN)

(73) Assignee: Vigyanlabs Innovations Private Limited, Mysore (IN)

( * ) Notice: Subject to any disclaimer, the term of this patent is extended or adjusted under 35 U.S.C. 154(b) by 397 days.

(21) Appl. No.: 12/683,306

(22) Filed: Jan. 6, 2010

(65) Prior Publication Data

US 2011/0167286 A1 Jul. 7, 2011

(51) Int. Cl.
*G06F 1/00* (2006.01)
*G06F 1/26* (2006.01)
*G06F 15/16* (2006.01)
*G06F 15/177* (2006.01)
*G06F 15/173* (2006.01)
*G06F 7/04* (2006.01)
*G05D 3/12* (2006.01)

(52) U.S. Cl. ........ 713/323; 713/320; 700/286; 709/219; 709/221; 709/224; 709/229; 726/2

(58) Field of Classification Search .................. 713/320, 713/323; 709/219, 221, 224, 229; 726/2; 700/286
See application file for complete search history.

(56) References Cited

U.S. PATENT DOCUMENTS

| 8,069,359 | B2 * | 11/2011 | Tolentino ...................... | 713/321 |
| 8,145,918 | B2 * | 3/2012 | Borghetti et al. ............. | 713/300 |
| 2002/0178387 | A1 * | 11/2002 | Theron ......................... | 713/300 |
| 2010/0058093 | A1 * | 3/2010 | Danieli et al. ................ | 713/340 |
| 2010/0229014 | A1 * | 9/2010 | Blackburn et al. ............ | 713/323 |

\* cited by examiner

*Primary Examiner* — Stefan Stoynov
(74) *Attorney, Agent, or Firm* — Rahman LLC

(57) ABSTRACT

A power management system includes a power management agent and a computing device comprising a CPU, memory, persistent storage, operating system, and communication mechanism. A power management server communicates with the communication mechanism using a secure communication protocol, communicates with the power management agent when the agent is in the connected mode, and provides a non-intrusiveness monitoring function. The power management agent operates in both a connected and disconnected mode, and maintains a list of applications, tasks, and activities and their dependency on power manageable components in the device. An application control framework defines a non-intrusiveness of a device for every application on the device and a usage of the device to allow fine grain control of the device. A management station sends a set of monitoring commands to at least one agent to monitor the intrusiveness of a power management function on the device without enforcing any power management.

11 Claims, 3 Drawing Sheets

FINE GRAIN NON-INTRUSIVE DISTRIBUTED INFORMATION TECHNOLOGY INFRASTRUCTURE POWER MANAGEMENT SYSTEM

BACKGROUND

1. Technical Field

The embodiments herein generally relate to power management of electronic devices, and more particularly to fine grain power management of distributed information technology (IT) infrastructure components as it applies to the user applications in a non-intrusive manner.

2. Description of the Related Art

Most IT infrastructure components such as desktop computers, servers, storage networks, switches, routers, operating systems, device drivers, and firmware provide capabilities to control the power usage of that device. The widely used techniques for power management are based mainly on switching on or a moving the device to a different power state based on the inactivity timeouts. Generally, inactivity or timeout based control of these devices disturb the usability of the device or the infrastructure by the end user(s). Current power management techniques tend to be intrusive and the intrusiveness have generally prevented the widespread adoption of power management system as suggested by Georgios et al., "Machine Learning for Adaptive Power Management", Intel Technology Journal, Nov. 9, 2006; and Microsoft, "Savings Costs and Energy with Windows Vista", White paper published by Microsoft, February 2009.

The current solutions to power management typically use the following approaches: a) Computing devices with keyboard/mouse (desktops, servers, laptops, personal display assistant (PDA)), power savings is achieved by change of the system or its components to a low power state (e.g., monitor, disk, central processing unit (CPU)) when there is no keyboard or mouse activity for a pre-configured idle timeout period as suggested in U.S. Pat. Nos. 5,560,024; 5,799,198; 6,574,740; 6,618,042; 6,694,442; 6,829,713; 6,845,456; and 7,119,786, the complete disclosures of which, in their entireties, are herein incorporated by reference. However, idleness of a system typically cannot be completely determined by using only the keyboard, mouse, system CPU, network input/output (I/O)—inactivity timeouts. Hence, this method does not typically work for many applications. b) For other systems such as servers, routers, switches, and uninterruptible power supply (UPS) if the system is idle, then a change to a low power state after a pre configured idle timeout period (here the idleness is defined by low or no CPU usage, low or no disk i/o or network activity) is performed as suggested in U.S. Pat. Nos. 6,131,166; 6,173,409; 6,583,947; 6,859,882; 7,272,735; and 7,308,591, the complete disclosures of which, in their entireties, are herein incorporated by reference. In practice given the continuous activity on the network in real deployments, power management is seldom fully enabled. In addition, generally there is no fine grain mechanism to allow for calculating the idle timeout period to incorporate various co-dependent applications/processes. c) If the power management causes disturbance to the users, then it is usually completely disabled negating any power saving benefits as suggested in the Georgios reference. d) Another approach is to see if a subcomponent of a system is not in use for a specified timeout interval then that subcomponent is moved to a low power state as suggested in U.S. Pat. Nos. 6,711,691; 7,119,786; and 7,308,591, the complete disclosures of which, in their entireties, are herein incorporated by reference. With this approach however users typically observe their applications as unresponsive as the system or its subcomponents may enter a low power state while the user is using the system as the system considers those components to be idle. In addition there could be potential loss or inconsistency in the system as the system is perceived to be idle when it is actually not idle and is moved to a lower power state/shutdown. e) Another approach includes disabling power management systems when certain applications are running or based on pre-determined calendar based schedule as suggested in the Microsoft White Paper. These solutions not only tend to reduce power savings but are generally very intrusive increasing the likelihood of disabling all power management settings. f) Other approaches use specialized changes to hardware via the system clock or other circuit settings to change processor or other component power consumption along with specialized software as suggested in U.S. Pat. Nos. 5,410,713; 5,428,790; 5,638,541; 5,696,952; 5,710,929; 5,784,628; 5,790,877; 6,219,796; 6,487,668; 6,694,442; 6,704,877; 6,788,156, the complete disclosures of which, in their entireties, are herein incorporated by reference. The chief drawback of these solutions is that they are generally very hardware specific and do not typically work across various nodes in a distributed IT infrastructure.

SUMMARY

In view of the foregoing, an embodiment herein provides a power management system comprising a power management agent; and at least one computing device comprising a central processing unit (CPU); a memory component operatively connected to the CPU; a persistent storage component operatively connected to the memory component; an operating system operated by the CPU; and at least one communication mechanism. The power management system further comprises a power management server that communicates with the at least one communication mechanism using a secure communication protocol, wherein the power management agent operates in both a connected and disconnected mode, wherein the power management server communicates with the power management agent when the agent is in the connected mode, wherein an application control framework on the power management server defines a non-intrusiveness of a device for every application on the device and a usage of the device to allow fine grain control of the device, wherein the power management agent maintains a list of applications, tasks, and activities and their dependency on power manageable components in the device, wherein the power management server provides a non-intrusiveness monitoring function, wherein a management station sends a set of monitoring commands to at least one agent to monitor the intrusiveness of a power management function on the device without enforcing any power management, and wherein the power management server collects intrusiveness information from monitored devices and advises an administrator of a particular set of devices to define the optimal non-intrusiveness power configuration for the device.

The users of the power management server may have role based access control that limits access to a particular device or an agent by a specific user. The power managed devices and agents may be grouped into specific groups based on administrator-defined parameters comprising any of agent/device type, physical location, operating system version, device model, and device supplier. The access control of the management server may be applied to a specific user in combination with device groups, and wherein the user is assigned a specific role for one or more device groups.

The non-intrusiveness of commonly used user applications may be built into the application control framework, rich clients in browser, Internet downloads, video players, audio players, software applications, web and application servers, virtual machines, virtual machine players, database servers, gaming applications, and developer tools, wherein the application control framework may provide an ability to define the non-intrusiveness for any new application, and wherein the non-intrusiveness is defined for a specific device or a group of devices in terms of policies. The power management server may collect data on power usage, application usage, user activity, system activity periodically from all power management agents which are connected in a distributed information technology infrastructure and stores the data in the persistent storage, and wherein the power management agents store the data to allow operation of the power management agents while not connected to the power management server.

The power management server may provide business intelligence reports on power usage, additional potential power savings, frequently used applications, unused applications, and potential optimizations on resource usage. The power management agent may maintain fine grain dependencies of an application, task, and activity on each of the power manageable components present in the device. The power management agent may determine a mapping between active applications and dependent power manageable components on a device. The power management agent may define and maintain application, task, and activity sensing parameters per application on a device. The computing device may further comprise a display device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
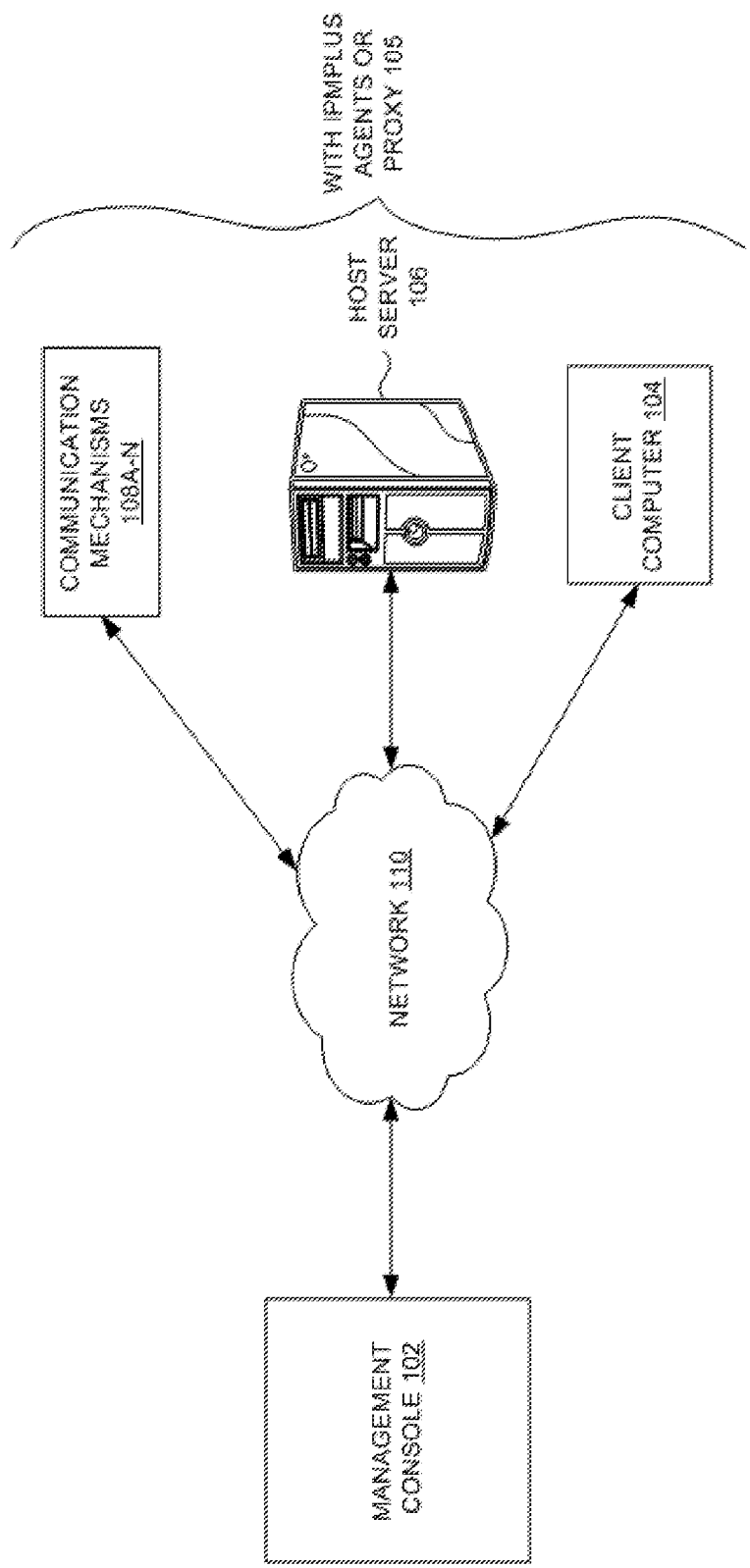
FIG. 1 illustrates a system diagram according to an embodiment herein.
Figure 2:
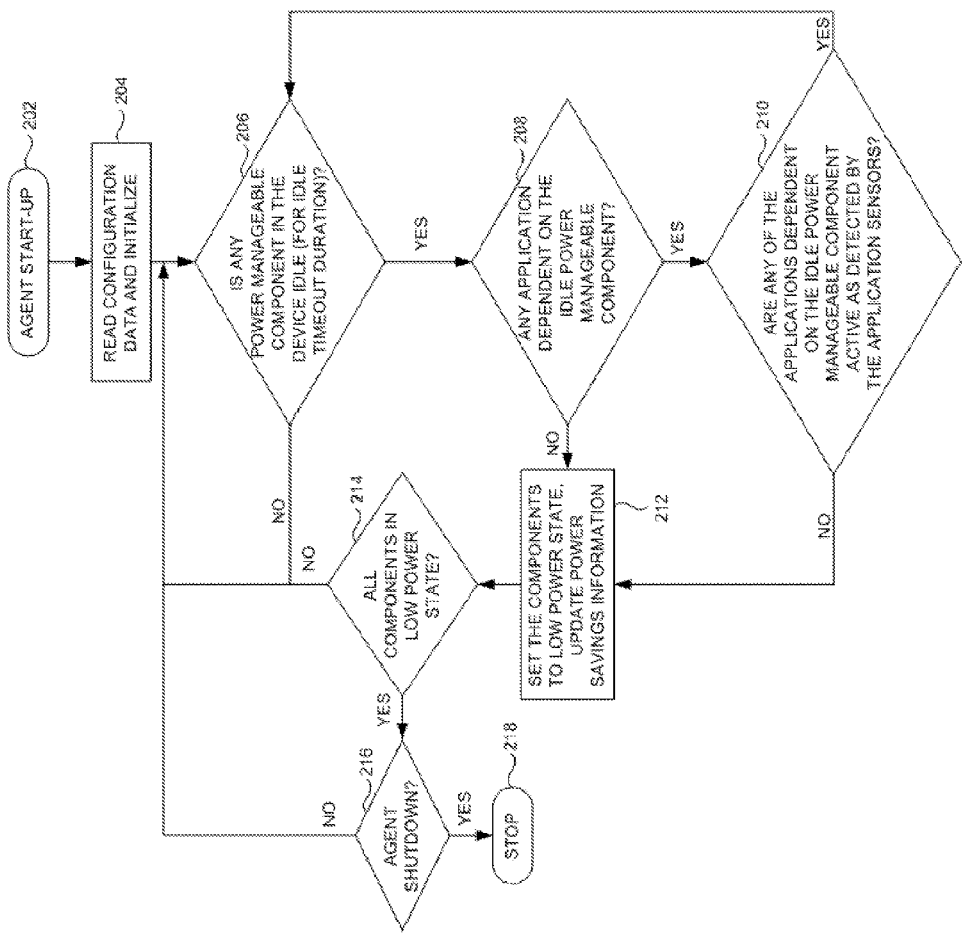
FIGS. 2 and 3 illustrate flow diagrams according to an embodiment herein.
Figure 3:
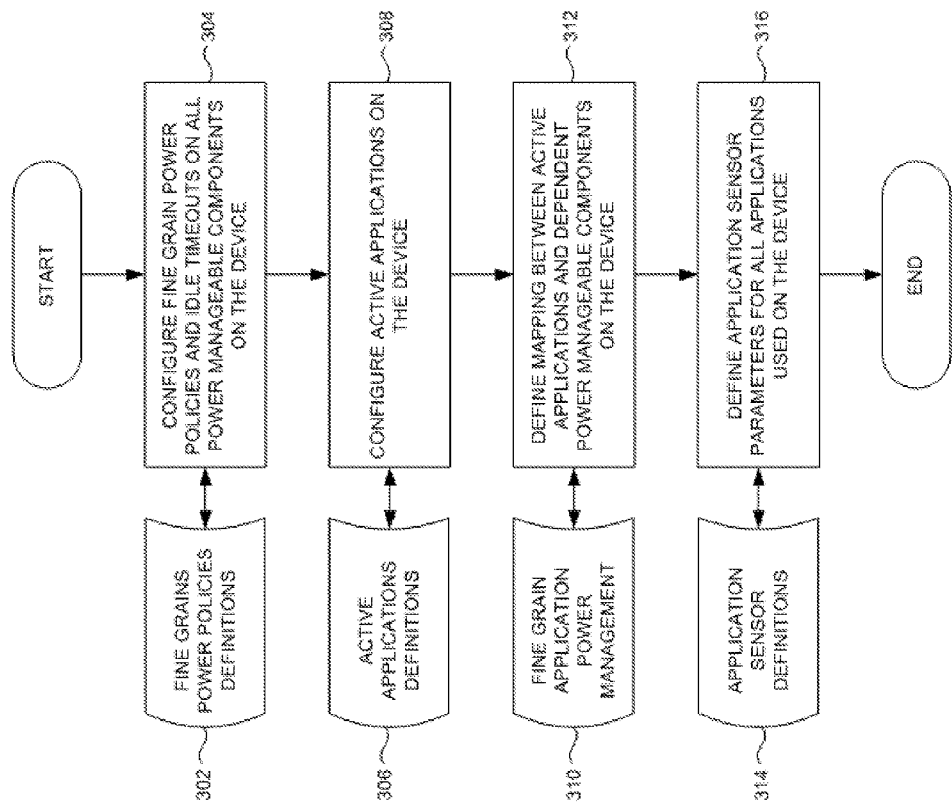

The power management system provided by the embodiments herein utilizes the existing power management facilities in the devices in a non-intrusive way, and relies on the use of devices or its components that already have the capability to change the power state and the interfaces provided by operating system (OS) and/or monitor. Referring now to the drawings, and more particularly to FIGS. 1 through 3, where similar reference characters denote corresponding features consistently throughout the figures, there are shown preferred embodiments.

The power management system 100 shown in FIG. 1 comprises a management console 102 communicating with a client computer 104, a host server 106, and communication mechanisms 108A-N through the network 110. The system 100 includes power management agent(s) along with one or more computing devices 104, which have a CPU, memory having a persistent storage, with or without a display device (not shown), an operating system or a monitor, and one or more communication mechanisms, such as routers, network switches, etc. 108A-N, which are either wired or wireless and communicates with the power management server, 106. The power management agent 105 communicates with one or more power management servers 106.

The power management agent 105 can operate in a connected or disconnected mode. The power management agent 105 logs data using the local cache/persistent storage (if any). The power management server 106 communicates with the power management agent 105 when the agent 105 is in the connected mode. The client computer 104 also stores the power policies and other databases specific to the client 104. In addition, the agent 105 and the server 106 communicate using a secure communication protocol.

The users of the power management server 106 have role based access control which limits the access to a particular device or an agent 105 by that specific user. In addition the power managed agents/devices can be grouped into specific groups based on any of the administrator defined parameters such as agent/device type, physical location, operating system version, device model, device supplier, etc. The access control in the management server 106 can be applied to a specific user in combination with the device groups; a user can be assigned a specific role for one or more device groups.

The application control framework on the management server 106 defines the non-intrusiveness of the device for every application on the device and its usage. The non-intrusiveness of the commonly used user applications are built into the framework, namely browser usage, Internet downloads, video players, audio players, software application (e.g., Microsoft Office™ applications), web and application servers, virtual machines, virtual machine players, database servers, gaming applications, and developer tools. In addition the framework provides the ability to define the non-intrusiveness for any new application. The non-intrusiveness can be defined for a specific device or a group of devices in terms of policies. The power management server 106 also provides a non-intrusiveness monitoring function wherein the management station sends a set of monitoring commands to one or more agents to monitor the intrusiveness of the power management function on that device without enforcing any power management. The power management server 106 collects the intrusiveness information from the monitored devices and advises the administrator of that set of devices to define the optimal non-intrusiveness power configuration for that device.

The power management server 106 collects data on the power usage, application usage, user activity, and system activity periodically from all the agents that are connected and stores them in its persistent storage. The power management server 106 provides business intelligence reports on the power usage, additional potential power savings, frequently used applications, unused applications, and potential optimizations on the resource usage.

The power management agent 105 maintains a list of applications/tasks/activities and their dependency on the power manageable components in the system. The following tables list the names of the applications/task/activities in the system and whether the application sensing parameters and fine grain power management is to be considered or not (enable indicates—to be considered, disable indicates not to be considered).

TABLE 1

List of Applications/Tasks/Activities in the system which is sensitive to power manageable devices/components

| Application/Task/Activity Name | Application Type - Interactive/Non-Interactive | Fine Grain Power Management (enable/disable) |
| --- | --- | --- |

TABLE 2

Fine Grain dependencies of an application/task/activity on each of the power manageable components present in that system
Application/Task/Activity -

| Power Manageable Component/Device | Dependency (Yes/No) |
| --- | --- |
| CPU Throttling | |
| Core Shutdown | |
| Other Co processors Shutdown/Throttle | |
| Hard Disk Off | |
| Monitor/Display Off | |
| Ethernet Lan Ports | |
| Other Network Ports | |
| Wireless Lan Ports | |
| USB Ports | |
| DVD Drives | |
| Tape Drives | |
| Other Peripherals | |
| System Shutdown | |
| System Low Power Mode | |
| Video Device | |
| Audio Device | |
| Other Storage Devices | |
| Cooling Fans | |
| Memory Controllers | |

One such table is created for each application/task/activity in the system. The second column as indicated by the dependency flag specifies whether the power manageable component/entire system can be moved to a low power state when that specific application/task/activity is considered to be active.

TABLE 3

Application/Task/Activity Sensing Parameters per application

| Application Sensing Parameter | Sensing Threshold | Sampling Interval | No. of Continuous Samples | Logical Operator (and, or, not) |
| --- | --- | --- | --- | --- |
| Process CPU Usage | | | | |
| Network I/O | | | | |
| Disk I/O | | | | |
| Audio I/O | | | | |
| Video I/O | | | | |
| Wireless I/O | | | | |

TABLE 3-continued

Application/Task/Activity Sensing Parameters per application

| Application Sensing Parameter | Sensing Threshold | Sampling Interval | No. of Continuous Samples | Logical Operator (and, or, not) |
| --- | --- | --- | --- | --- |
| Open Files | | | | |
| Memory Usage | | | | |
| Open Connections | | | | |
| Dependant Tasks | | | | |

An application/task/activity is considered to be active in the system only if the sensing threshold set of rules in Table 3 returns true for that application. Sensors are threshold detectors for the usage of power manageable components. A sensing threshold is compared with the application sensing parameter by sampling the value of the parameter at every sampling interval for the duration of the no of continuous samples. If the measured value of the parameter exceeds the sensing threshold continuously for the number of continuous samples then the application sensing parameter is marked as true. The same is repeated for all other Application Sensing parameters.

FIG. 2 is a flow diagram illustrating a method of detecting applications dependent on an idle power manageable component according to an embodiment herein. In step 202, an agent execution process is started. In step 204, configuration data is read and initialized. In step 206, it is checked whether any power manageable component in the computing device 104 in FIG. 1 is idle (for idle timeout duration). If yes, it is checked whether any application is dependent on the idle power manageable component in step 208. Else (If No), step 206 is repeated. If any application is dependent on the idle power manageable component (if yes), it is checked whether any of the applications are dependent on the idle power manageable component are active as detected by the application sensors in step 210. Else (if No), the components are set to low power state, and power savings information is updated in step 212. If any of the applications are dependent on the idle power manageable component are active as detected by the application sensors then step 206 is repeated. Else (if No), step 212 is repeated. In step 214, it is checked whether all the components are in low power state. If all components are in low power state, (if yes) then it is checked for the agent shutdown in step 216. Else (if No) then step 206 is repeated. If the agent is shutdown, then the process is terminated in step 218. Else (if No), step 206 is repeated.

The final value of the composite application sensing parameters is calculated by logical operations on the individual application sensing parameter. FIG. 3 is a flow diagram illustrating the agent initial setup/configuration and corresponding configuration tables according to an embodiment herein. In step 302, fine grain power policies are defined. In step 304, the fine grain power policies and idle timeouts are configured on all power manageable components on the computing device 104. In step 306, active applications are defined. In step 308, the active applications are configured on the computing device 104. In step 310, the fine grain application power management manages the applications on the computing device 104. In step 312, mapping between active applications and dependent power manageable components is defined on the computing device 104. In step 314, the application sensor is defined. In step 316, the application sensor parameters are defined for all applications used on the computing device 104. The configuration tables are: 1. List of applications/tasks/activities and their dependency on the power manageable components in the device. 2. For each application the fine grain dependency on each of the power manageable components present in the device. 3. application/task/activity sensing parameters per application on the device.

In one embodiment of this application for a desktop computer running a commonly used application called the SKYPE™ communication system and the previous Tables 1-3 will have values shown below.

TABLE 1

| Application/Task/<br>Activity Name | Application Type -<br>Interactive/Non-Interactive | Fine Grain Power<br>Management<br>(enable/disable) |
|---|---|---|
| Skype.exe | Interactive | Enable |

TABLE 2

Application/Task/Activity - Skype.exe

| Power Manageable Component/Device | Low Power Mode<br>(Enable/Disable) |
|---|---|
| CPU Throttling | Enable |
| Core Shutdown | Enable |
| Other Co processors Shutdown/Throttle | Disable |
| Hard Disk Off | Enable |
| Monitor/Display | Disable |
| Ethernet Lan Ports | Disable |
| Other Network Ports | Enable |
| Wireless Lan Ports | Disable |
| USB Ports | Enable |
| DVD Drives | Enable |
| Tape Drives | Enable |
| Other Peripherals | Enable |
| System Shutdown | Disable |
| System Low Power Mode | Disable |
| Video Device | Disable |
| Other Storage Device | Enable |
| Cooling Fans | Enable |
| Memory Controllers | Disable |
| Audio Device | Disable |

TABLE 3

| Application<br>Name | Skype.exe - Application is Active if | | | |
|---|---|---|---|---|
| Application<br>Sensing<br>Parameter | Sensing<br>Threshold | Sampling<br>Interval | No. of<br>Continuous<br>Samples | Logical<br>Operator<br>(and, or, not) |
| Application CPU Usage | 5% | 2 secs | 30 | — |
| Network I/O Delta | 1000 Bytes | 2 secs | 30 | Or |
| Disk I/O Delta | 1000 Bytes | 2 secs | 30 | Or |
| Audio I/O Delta | 4000 bytes | 2 secs | 30 | Or |
| Video I/O Delta | 4000 bytes | 2 secs | 30 | Or |

In this embodiment the desktop monitor, audio, video ports/devices are not turned off if the SKYPE™ application is considered to be active. The SKYPE™ application is considered to be active in the system if the application CPU usage of the SKYPE™ application exceeds the threshold for the continuous samples with a sampling interval of two seconds or the network I/O or the disk I/O or audio I/O; video I/O sensing parameters exceed the defined threshold value. However, if the SKYPE™ application is running in the system and the composite application sensing parameters return false—then the monitor, audio, and video devices can be turned off and subsequently the entire system can be moved to the low power state. Another embodiment of this system is for a disk array unit in a storage area network. The Tables will have values shown below in such an embodiment.

TABLE 1

| Application/Task/<br>Activity Name | Application Type -<br>Interactive/<br>Non-Interactive | Fine Grain Power<br>Management<br>(enable/disable) |
|---|---|---|
| PerformanceOptimizer.exe | Non-Interactive | Enable |

TABLE 2

Application/Task/Activity - Performance Optimizer

| Power Manageable Component/Device | Low Power Mode<br>(Enable/Disable) |
|---|---|
| Controller CPU Throttling | Enable |
| Core Shutdown | Disable |
| Other Co processors Shutdown/Throttle | Disable |
| Hard Disk Off | Disable |
| Ethernet Lan Ports | Enable |
| Other Network Ports | Enable |
| Cooling Fans | Enable |
| Memory Controllers | Disable |
| FC Ports | Enable |
| Power Supply Throttling | Enable |
| Host Port controller Throttling | Enable |

TABLE 3

| | Performance Optimizer | | | |
|---|---|---|---|---|
| Application Name<br>Application Sensing<br>Parameter | Sensing<br>Threshold | Sampling<br>Interval | No. of<br>Continuous<br>Samples | Logical<br>Operator<br>(and,<br>or, not) |
| Host Port CPU Usage | 5% | 5 secs | 30 | — |
| Network I/O Delta | 1000 Bytes | 2 secs | 30 | Or |
| Disk I/O Delta | 1000 Bytes | 2 secs | 30 | Or |
| FC Ports I/O Delta | 1000 Bytes | 2 secs | 30 | Or |

The embodiments herein enable fine-grain management of power specific to the applications used on the system via a framework which defines the sensitivity of an application to various system parameters. In addition the framework allows when to move a system or its power manageable sub-component to a low power/off state without causing interference to the users work on the system or the applications active on the system. The embodiments herein allow non-Intrusiveness or minimal annoyance to the users who use the system directly or indirectly while saving power. The embodiments herein further provide a framework that can be customized to specific usage of the system for each individual user or a group of users; a framework with pre-built application specific policies for most of the commonly used applications for home users, small business, enterprise users, data centers; and a framework that incorporates many devices like switches and routers and not just individual computing workstations in a distributed IT infrastructure The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A power management system comprising:
   at least one power management agent;
   at least one computing device comprising:
      a central processing unit (CPU);
      a memory component operatively connected to said CPU;
      a persistent storage component operatively connected to said memory component; and
      an operating system operated by said CPU;
   at least one communication mechanism operatively connected to said at least one computing device; and
   a power management server that communicates with said at least one communication mechanism using a secure communication protocol,
   wherein said at least one power management agent operates in both a connected and disconnected mode,
   wherein said power management server communicates with said at least one power management agent when said at least one power management agent is in said connected mode,
   wherein an application control framework on said power management server defines a non-intrusiveness of said at least one computing device for every application on said at least one computing device and a usage of said at least one computing device to allow fine grain control of said at least one computing device,
   wherein said at least one power management agent maintains a list of applications, tasks, and activities and their dependency on power manageable components in said at least one computing device,
   wherein said power management server provides a non-intrusiveness monitoring function,
   wherein a management station sends a set of monitoring commands to said at least one power management agent to monitor the intrusiveness of a power management function on said at least one computing device without enforcing any power management, and
   wherein said power management server collects intrusiveness information from a monitored said at least one computing device and advises an administrator of a particular said at least one computing device to define the optimal non-intrusiveness power configuration for said at least one computing device.

2. The power management system of claim 1, wherein users of said power management server have role based access control that limits access to a particular at least one computing device or a particular power management agent by a specific user.

3. The power management system of claim 2, wherein a plurality of power managed devices and power management agents are grouped into specific groups based on administrator-defined parameters comprising any of agent/device type, physical location, operating system version, device model, and device supplier.

4. The power management system of claim 3, wherein access control of said management server is applied to a specific user in combination with a group of computing devices, and wherein said user is assigned a specific role for at least one group of said computing devices.

5. The power management system of claim 1,
   wherein said non-intrusiveness of commonly used user applications are built into said application control framework, rich clients in browser, Internet downloads, video players, audio players, software applications, web and application servers, virtual machines, virtual machine players, database servers, gaming applications, and developer tools,
   wherein said application control framework provides an ability to define the non-intrusiveness for any new application, and
   wherein the non-intrusiveness is defined for a specific at least one computing device or a group of computing devices in terms of policies.

6. The power management system of claim 1, wherein said power management server comprises a server persistent storage, wherein said power management server collects data on power usage, application usage, user activity, system activity periodically from all power management agents which are connected in a distributed information technology infrastructure and stores said data in said server persistent storage, and wherein said all power management agents store said data to allow operation of said all power management agents while not connected to said power management server.

7. The power management system of claim 1, wherein said power management server provides business intelligence reports on power usage, additional potential power savings, frequently used applications, unused applications, and potential optimizations on resource usage.

8. The power management system of claim 1, wherein said at least one power management agent maintains fine grain dependencies of an application, task, and activity on each of said power manageable components present in said at least one computing device.

9. The power management system of claim 1, wherein said at least one power management agent determines a mapping between active applications and dependent power manageable components on said at least one computing device.

10. The power management system of claim 1, wherein said at least one power management agent defines and maintains application, task, and activity sensing parameters per application on said at least one computing device.

11. The power management system of claim 1, wherein said at least one computing device further comprises a display device.

* * * * *